United States Patent
Zhu et al.

(10) Patent No.: US 11,845,821 B2
(45) Date of Patent: Dec. 19, 2023

(54) HUMIDITY-STIFFENING POLYMER MATERIAL, AND PREPARATION METHOD THEREFOR AND USE THEREOF

(71) Applicant: THE CHINESE UNIVERSITY OF HONG KONG, SHENZHEN, Guangdong (CN)

(72) Inventors: Shiping Zhu, Guangdong (CN); Xiaoqing Ming, Guangdong (CN); Le Yao, Guangdong (CN); Qi Zhang, Guangdong (CN)

(73) Assignee: The Chinese University of Hong Kong, Shenzhen, Guangdong (CN)

( * ) Notice: Subject to any disclaimer, the term of this patent is extended or adjusted under 35 U.S.C. 154(b) by 0 days.

(21) Appl. No.: 18/251,857

(22) PCT Filed: Nov. 2, 2022

(86) PCT No.: PCT/CN2022/129220
§ 371 (c)(1),
(2) Date: May 4, 2023

(87) PCT Pub. No.: WO2023/098376
PCT Pub. Date: Jun. 8, 2023

(65) Prior Publication Data
US 2023/0322986 A1    Oct. 12, 2023

(51) Int. Cl.
*C08F 220/18* (2006.01)
*C08K 5/42* (2006.01)
*C08K 5/435* (2006.01)

(52) U.S. Cl.
CPC .......... *C08F 220/1807* (2020.02); *C08K 5/42* (2013.01); *C08K 5/435* (2013.01)

(58) Field of Classification Search
CPC ...... C08F 220/1807; C08K 5/42; C08K 5/435
See application file for complete search history.

(56) References Cited

U.S. PATENT DOCUMENTS

| | | | | |
|---|---|---|---|---|
| 6,372,829 B1 * | 4/2002 | Lamanna | ........ | C09K 3/16 524/84 |
| 6,592,988 B1 * | 7/2003 | Thompson | ........ | D06M 15/277 428/394 |

FOREIGN PATENT DOCUMENTS

| | | | | |
|---|---|---|---|---|
| CN | 109890935 A | | 6/2019 | |
| EP | 3835378 A1 | * | 6/2021 | ............. C08L 63/00 |
| JP | 2011-213862 A | | 10/2011 | |
| JP | 5332315 B2 | * | 11/2013 | .......... C09J 133/062 |
| JP | 5723532 B2 | * | 5/2015 | |
| KR | 20160079714 A | * | 7/2016 | |
| KR | 1020160079713 A | * | 7/2016 | |
| KR | 20160110901 A | * | 9/2016 | |
| KR | 20170042231 | * | 4/2017 | |
| KR | 20170106210 | * | 9/2017 | |
| KR | 20170121072 | * | 11/2017 | |
| KR | 1020180087293 A | * | 8/2018 | |
| KR | 102252720 B1 | * | 5/2021 | |
| TW | 202210598 A | * | 3/2022 | ............... B08B 7/00 |
| WO | WO-2009031548 A1 | * | 3/2009 | .......... C09J 133/062 |
| WO | WO-2009111433 A1 | * | 9/2009 | .......... C08F 297/026 |
| WO | WO-2014208695 A1 | * | 12/2014 | ............... B32B 7/12 |
| WO | WO-2015102086 A1 | * | 7/2015 | ............. B32B 27/06 |
| WO | 2018084810 A1 | | 5/2018 | |
| WO | WO-2020086454 A1 | * | 4/2020 | .......... C08K 5/3445 |
| WO | WO-2021115772 A1 | * | 6/2021 | .......... B32B 15/043 |
| WO | 2021259594 A1 | | 12/2021 | |
| WO | WO-2021259594 A1 | * | 12/2021 | ............... B08B 7/00 |
| WO | WO-2023014416 A1 | * | 2/2023 | ........ C08F 222/1063 |

OTHER PUBLICATIONS

Notification to Grant Patent Right for Invention for Chinese Patent Application No. 202111453532.7 issued by the Chinese Patent Office dated Aug. 3, 2023.
First Search for Chinese Patent Application No. 202111453532.7 issued by the Chinese Patent Office.

* cited by examiner

Primary Examiner — Sanza L. McClendon
(74) Attorney, Agent, or Firm — IP & T GROUP LLP

(57) ABSTRACT

The present disclosure provides a humidity-stiffening polymer material, and a preparation method therefor and a use thereof. The humidity-stiffening polymer material includes the following raw materials: a monomer, an ionic liquid, a salt, a cross-linking agent and an initiator, wherein the monomer includes benzyl methacrylate, the ionic liquid includes an imidazole-based ionic liquid, and the salt includes a hygroscopic salt. The method for preparing the humidity-stiffening polymer material includes: mixing the raw materials to obtain a precursor liquid, performing reaction on the mixture after degassing, and drying the mixture to obtain the humidity-stiffening polymer material. The humidity-stiffening polymer material is applied to actuators, soft robots and wearable biomedical devices based on bionic design.

8 Claims, 4 Drawing Sheets

HUMIDITY-STIFFENING POLYMER MATERIAL, AND PREPARATION METHOD THEREFOR AND USE THEREOF

CROSS-REFERENCE TO RELATED APPLICATION

The present disclosure claims priority of Chinese Patent Application No. CN202111453532.7 filed to China National Intellectual Property Administration on Dec. 1, 2021 and entitled "HUMIDITY-STIFFENING POLYMER MATERIAL, AND PREPARATION METHOD THEREFOR AND USE THEREOF", which is hereby incorporated by reference in its entirety.

TECHNICAL FIELD

The present disclosure relates to the field of new materials, in particular to a humidity-stiffening polymer material, and a preparation method therefor and a use thereof.

BACKGROUND

In recent years, the demands of various fields for the bionic technology promote the development of environment stimulus-responsive polymer materials, so that actuators, soft robots and wearable biomedical devices based on bionic design emerge endlessly. Such stimuli typically include temperature, humidity, pH, pressure, light, and magnetic field, wherein humidity (water) has been extensively focused on and researched due to its advantages such as wide sources, greenness, and low energy consumption. Conventional humidity-responsive materials (e.g., hydrophilic polymer materials) typically exhibit reduced stiffness and strength due to the plasticizing effect of water in high humidity environments, greatly limiting their use in high humidity and even water-based environments.

The development of humidity-stiffening polymer materials is beneficial to the selection and use of intelligent materials with expanded humidity response, though it is also extremely challenging.

SUMMARY

The present disclosure provides a humidity stiffening polymer material, which comprises the following raw materials:

a monomer, an ionic liquid, a salt, a cross-linking agent and an initiator, wherein the monomer comprises benzyl methacrylate, the ionic liquid comprises an imidazole-based ionic liquid, and the salt comprises a hygroscopic salt compatible with a polymer formed by the monomer and the ionic liquid.

Optionally, the ionic liquid comprises one or more of 1,3-dimethylimidazolium bis(trifluoromethylsulfonyl) imide, 1-ethyl-3-methylimidazolium bis(trifluoromethylsulfonyl)imide, 1-propyl-3-methylimidazolium bis(trifluoromethylsulfonyl)imide, and 1-butyl-3-methylimidazolium bis(trifluoromethylsulfonyl)imide.

Optionally, the hygroscopic salt comprises one or more of lithium bis(trifluoromethanesulphonyl)imide, lithium perchlorate, lithium chloride, lithium trifluoromethanesulfonate, zinc bis(trifluoromethylsulfonyl)imide, zinc chloride, zinc trifluoromethanesulfonate, and potassium bis(trifluoromethanesulfonly)imide.

Optionally, the cross-linking agent comprises one or more of a multifunctional acrylate cross-linking agent, a multifunctional acrylamide cross-linking agent, and a multifunctional vinyl cross-linking agent.

Optionally, the multifunctional acrylate cross-linking agent comprises: one or more of poly(ethylene glycol) diacrylate, 1,3-propanediol diacrylate, 1,4-butanediol diacrylate, 1,6-hexanediol diacrylate, ethylene glycol dimethylacrylate, and ethylene glycol diacrylate.

Optionally, the multifunctional acrylamide cross-linking agent comprises methylenebisacrylamide.

Optionally, the multifunctional vinyl cross-linking agent comprises divinylbenzene and/or diethylene glycol divinyl ether.

Optionally, the initiator comprises a photoinitiator or a thermal initiator.

Optionally, the photoinitiator comprises one or more of 2,4,6 (trimethylbenzoyl)diphenylphosphine oxide, ethyl 2,4,6-trimethylbenzoylphosphinate, 2-methyl-1-[4-methylthiophenyl]-2-morpholino-1-propanone, 2-isopropylthioxanthone, ethyl 4-(dimethylamino)benzoate, 1-hydroxycyclohexyl phenyl ketone, 2-hydroxy-2-methyl-1-phenyl-1-propanone, benzoin dimethyl ether, methyl o-benzoylbenzoate, 4-chlorobenzophenone, 4-phenylbenzophenone and 2-hydroxy-2-methyl-1-[4-(2-hydroxyethoxy)phenyl]-1-propanone.

Optionally, the thermal initiator comprises one or more of azobisisobutyronitrile, azobisisovaleronitrile, azobisisoheptonitrile, dimethyl 2,2'-azobis(2-methylpropionate), 2-(1-cyano-1-methylethyl)azocarboxamide, 1,1'-azobis(cyanocyclohexane), dibenzoyl peroxide, dicumyl peroxide, methyl ethyl ketone peroxide, di-tert-butyl peroxide, potassium persulfate, and ammonium persulphate.

Optionally, the mass ratio of the monomer to the ionic liquid is 1:0.5-1.5, the mass ratio of the monomer to the salt is 1:0.25-1, the mass of the cross-linking agent accounts for 0.01%-10% of the mass of the monomer, and the amount of the initiator accounts for 0.01%-10% of the mass of the monomer.

Optionally, the mass ratio of the monomer to the ionic liquid is 1:1, the mass ratio of the monomer to the salt is 1:0.5, the mass of the cross-linking agent accounts for 0.1%-1% of the mass of the monomer, and the amount of the initiator accounts for 0.5%-5% of the mass of the monomer.

The present disclosure further provides a method for preparing the humidity-stiffening polymer material, which comprises:

mixing the raw materials to obtain a precursor liquid, performing reaction on the mixture after degassing, and drying the mixture to obtain the humidity-stiffening polymer material.

Optionally, the degassing is performed for 0.5-30 min at a vacuum degree of 1-20 KPa.

Optionally, the reaction condition is photoinitiation or thermal initiation.

Optionally, the photoinitiation is performed for 0.01-24 h with a light source power density of 1-1000 mW/cm$^2$ at a wavelength of 200-450 nm.

Optionally, the thermal initiation is performed for 1-72 h at a temperature of 40-110° C.

Optionally, the drying was performed for 18-24 h at a vacuum degree of 0.1-1000 Pa and a temperature of 20-100° C.

The present disclosure further provides use of the humidity-stiffening polymer material in actuators, soft robots and wearable biomedical devices based on bionic design.

The present disclosure further provides use of the humidity-stiffening polymer material prepared by the method in actuators, soft robots and wearable biomedical devices based on bionic design.

The present disclosure further provides a method for manufacturing a component or an article, the method comprising stretching and/or thermoforming the humidity-stiffening polymer material according to any one of the above or the humidity-stiffening polymer material prepared by the method to define the component or article.

The present disclosure further provides a thermoformed or stretched component or article, wherein the component or article comprises the humidity-stiffening polymer material according to any one of the above or the humidity-stiffening polymer material prepared by the method, or is manufactured by the manufacturing method described above.

BRIEF DESCRIPTION OF THE DRAWINGS

In order to more clearly illustrate the technical schemes of the embodiments of the present disclosure, the drawings required in the embodiments will be briefly described below. It should be understood that the following drawings only illustrate some embodiments of the present disclosure and therefore should not be considered as limitations of the scope.

DETAILED DESCRIPTION OF THE EMBODIMENTS

Figure 1:
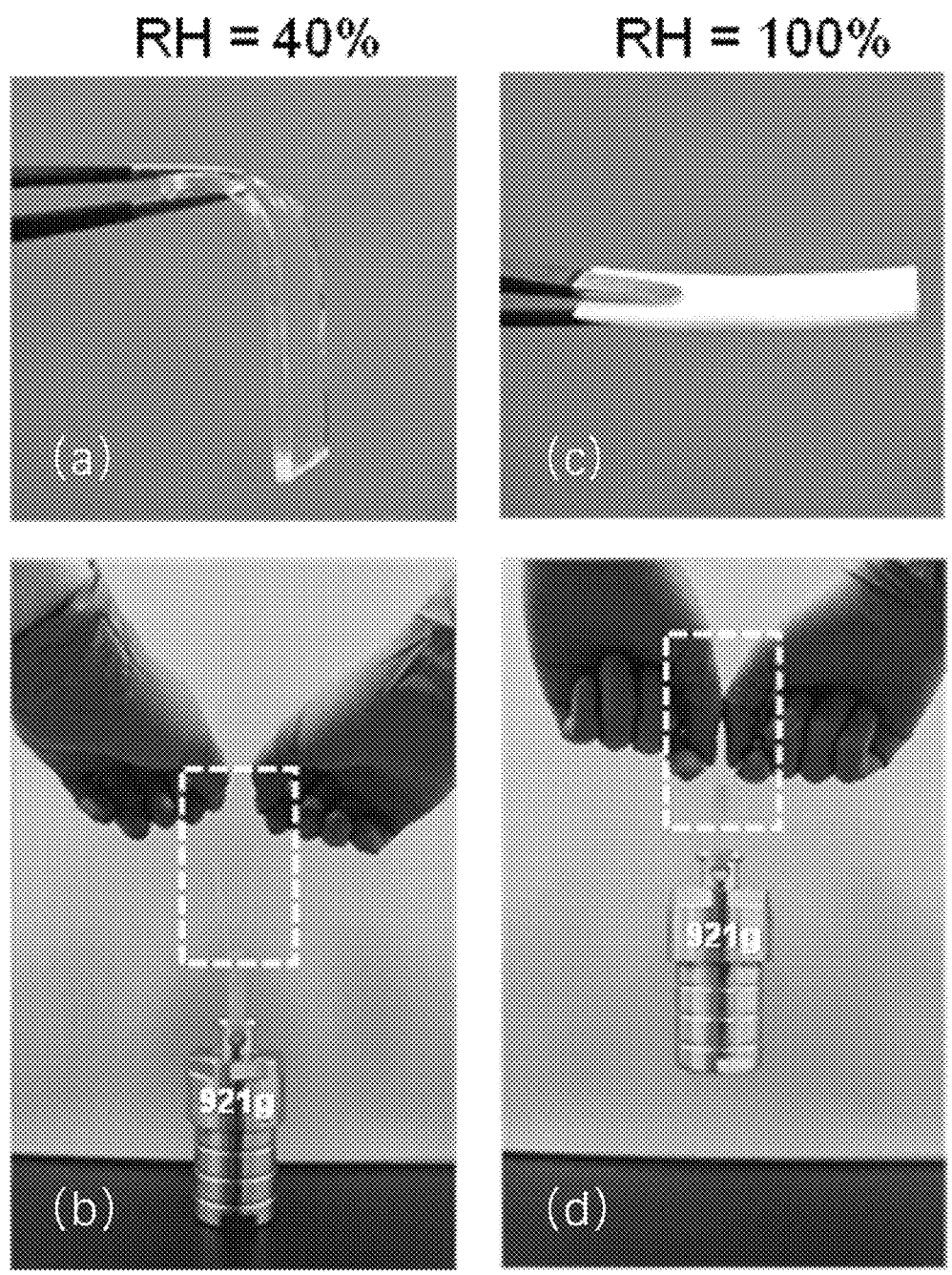
FIG. 1 is a demonstration photograph of the mechanical properties of the material obtained in Example 1 under different humidity.

In the terms as used herein:
the term "prepared by . . ." is synonymous with "include". As used herein, the terms "include", "comprise", "has", "contain" or any other variation thereof, are intended to cover a non-exclusive inclusion. For example, a composition, step, method, article, or apparatus that includes a list of elements is not necessarily limited to only those elements but may comprise other elements not expressly listed or inherent to such composition, step, method, article, or apparatus.

The conjunction "consisting of . . ." excludes any non-specified element, step, or component. If used in a claim, this phrase will make the claim closed so that it does not include material other than those described except for the conventional impurities associated therewith. When the phrase "consisting of . . ." appears in a clause of the claim body and not immediately after the subject matter, it defines only the elements described in the clause; no other elements are excluded from the claims as a whole.

When an amount, concentration, or other value or parameter is expressed as a range, preferred range, or as a range defined by a list of upper preferred values and lower preferred values, it is to be understood as disclosing all ranges formed from any pair of any upper range limit or preferred value and any lower range limit or preferred value, regardless of whether ranges are separately disclosed. For example, when the range "1-5" is disclosed, the ranges described should be construed to include the ranges "1-4", "1-3", "1-2", "1-2 and 4-5", "1-3 and 5", and the like. When a range of values is described herein, unless otherwise specified, the range is intended to include the endpoints thereof, and all integers and fractions within the range.

In these examples, the parts and percentages are by mass unless otherwise indicated.

"Parts by mass" refers to a basic unit of measure indicating a mass ratio of a plurality of components, and 1 part by mass may indicate any unit mass, for example, may indicate 1 g, or may also indicate 2.689 g. If the parts by mass of the component A are a parts and the parts by mass of the component B are b parts, the mass ratio of the component A to the component B is represented by a:b. Alternatively, the mass of the A component is aK and the mass of the B component is bK (K is an arbitrary number, and represents a multiplying factor). It should not be misunderstood that, unlike the mass fraction, the sum of the parts by mass of all the components is not limited to the limit of 100 parts.

"And/or" is used to indicate that one or both of the illustrated conditions may occur, e.g., A and/or B includes (A and B) and (A or B).

Some embodiments of the present disclosure provide a humidity-stiffening polymer material, which comprises the following raw materials:

a monomer, an ionic liquid, a salt, a cross-linking agent and an initiator, wherein the monomer comprises benzyl methacrylate, the ionic liquid comprises an imidazole-based ionic liquid, and the salt comprises a hygroscopic salt compatible with polymer formed by the monomer and the ionic liquid.

In an optional embodiment, the ionic liquid includes, but is not limited to, one or more of 1,3-dimethylimidazolium bis(trifluoromethylsulfonyl)imide, 1-ethyl-3-methylimidazolium bis(trifluoromethylsulfonyl)imide, 1-propyl-3-methylimidazolium bis(trifluoromethylsulfonyl)imide, and 1-butyl-3-methylimidazolium bis(trifluoromethylsulfonyl)imide.

In an optional embodiment, the salt includes, but is not limited to, one or more of lithium bis(trifluoromethanesulphonyl)imide, lithium perchlorate, lithium chloride, lithium trifluoromethanesulfonate, zinc bis(trifluoromethylsulfonyl)imide, zinc chloride, zinc trifluoromethanesulfonate, and potassium bis(trifluoromethanesulfonly)imide.

In an optional embodiment, the hygroscopic salt includes, but is not limited to, one or more of lithium bis(trifluoromethanesulphonyl)imide, lithium perchlorate, lithium chloride, lithium trifluoromethanesulfonate, zinc bis(trifluoromethylsulfonyl)imide, zinc chloride, zinc trifluoromethanesulfonate, and potassium bis(trifluoromethanesulfonly) imide.

In an optional embodiment, the cross-linking agent includes, but is not limited to, one or more of a multifunctional acrylate cross-linking agent, a multifunctional acrylamide cross-linking agent, and a multifunctional vinyl cross-linking agent.

In an optional embodiment, the multifunctional acrylate cross-linking agent includes, but is not limited to: one or more of poly(ethylene glycol) diacrylate, 1,3-propanediol diacrylate, 1,4-butanediol diacrylate, 1,6-hexanediol diacrylate, ethylene glycol dimethylacrylate, and ethylene glycol diacrylate.

In an optional embodiment, the multifunctional acrylamide cross-linking agent includes, but is not limited to, methylenebisacrylamide.

In an optional embodiment, the multifunctional vinyl cross-linking agent comprises divinylbenzene and/or diethylene glycol divinyl ether.

In an optional embodiment, the initiator comprises a photoinitiator or a thermal initiator.

In an optional embodiment, the photoinitiator comprises one or more of 2,4,6 (trimethylbenzoyl)diphenylphosphine oxide, ethyl 2,4,6-trimethylbenzoylphosphinate, 2-methyl-1-[4-methylthiophenyl]-2-morpholino-1-propanone, 2-isopropylthioxanthone, ethyl 4-(dimethylamino)benzoate, 1-hydroxycyclohexyl phenyl ketone, 2-hydroxy-2-methyl-1-phenyl-1-propanone, benzoin dimethyl ether, methyl o-benzoylbenzoate, 4-chlorobenzophenone, 4-phenylbenzophenone and 2-hydroxy-2-methyl-1-[4-(2-hydroxyethoxy) phenyl]-1-propanone.

In an optional embodiment, the thermal initiator comprises one or more of azobisisobutyronitrile, azobisisovaleronitrile, azobisisoheptonitrile, dimethyl 2,2'-azobis(2-methylpropionate), 2-(1-cyano-1-methylethyl) azocarboxamide, 1,1'-azobis(cyanocyclohexane), dibenzoyl peroxide, dicumyl peroxide, methyl ethyl ketone peroxide, di-tert-butyl peroxide, potassium persulfate, and ammonium persulphate.

In an optional embodiment, the mass ratio of the monomer to the ionic liquid is 1:0.5-1.5, the mass ratio of the monomer to the salt is 1:0.25-1, the mass of the cross-linking agent accounts for 0.01%-10% of the mass of the monomer, and the amount of the initiator accounts for 0.01%-10% of the mass of the monomer.

In an optional embodiment, the mass ratio of the monomer to the ionic liquid is 1:1, the mass ratio of the monomer to the salt is 1:0.5, the mass of the cross-linking agent accounts for 0.1%-1% of the mass of the monomer, and the amount of the initiator accounts for 0.5%-5% of the mass of the monomer.

Optionally, the mass ratio of the monomer to the ionic liquid may be, for example, 1:0.7-1.3, 1:0.8-1.2, or 1:0.9-1.1, such as 1:0.5, 1:0.6, 1:0.7, 1:0.8, 1:0.9, 1:1. 1:1.1, 1:1.2, 1:1.3, 1:1.4, 1:1.5 or 1:any value between 0.5 and 1.5, or a value in a range between any two of these values (inclusive). The mass ratio of the monomer to the salt may be, for example, 1:0.3-0.9, 1:0.35-0.65, or 1:0.4-0.5, such as 1:0.25, 1:0.3, 1:0.35, 1:0.4, 1:0.45, 1:0.5, 1:0.55, 1:0.6, 1:0.65, 1:0.7, 1:0.75, 1:0.8, 1:0.85, 1:0.9, 1:0.95, 1:1 or 1:any value between 0.25 and 1, or a value in a range between any two of these values (inclusive). The proportion of the mass of cross-linking agent to the mass of monomer may be, for example, 0.02%-6%, 0.05%-4%, or 0.1%-2%, such as 0.01%, 0.05%, 0.1%, 0.5%, 1%, 5%, 10% or any value between 0.01% to 10%, or a value in a range between any two of these values (inclusive). The proportion of the amount of the initiator to the mass of monomer may be, for example, 0.1%-8%, 0.3%-6%, or 0.5%-4%, such as 0.01%, 0.05%, 0.1%, 0.5%, 1%, 5%, 10% or any value between 0.01% to 10%, or a value in a range between any two of these values (inclusive).

Some embodiments of the present disclosure further provide a method for preparing the humidity-stiffening polymer material, which comprises:

mixing the raw materials to obtain a precursor liquid, performing reaction on the mixture after degassing, and drying the mixture to obtain the humidity-stiffening polymer material.

In an optional embodiment, the degassing is performed for 0.5-30 min at a vacuum degree of 1-20 KPa.

Optionally, in the degassing, the vacuum degree may be, for example, 4-18 KPa, 6-15 KPa, or 8-12 KPa, such as 1 KPa, 5 KPa, 10 KPa, 15 KPa, 20 KPa or any value between 1 KPa and 20 KPa, or a value in a range between any two of these values (inclusive); the time may be, for example, 1-28 min, 4-25 min, or 8-20 min, such as 0.5 min, 1 min, 5 min, 10 min, 15 min, 20 min, 25 min, 30 min or any value between 0.5 min and 30 min.

In an optional embodiment, the reaction condition is photoinitiation or thermal initiation.

It should be noted that the preparation method for the polymer material of the present disclosure includes, but is not limited to, photoinitiation or thermal initiation, and all preparation methods capable of forming the structure, such as a soaking method, may be used in the present disclosure.

In an optional embodiment, the photoinitiation is performed for 0.01-24 h with a light source power density of 1-1000 mW/cm$^2$ at a wavelength of 200-450 nm.

Optionally, in photoinitiation conditions, the light source power density may be, for example, from 1-1000 mW/cm$^2$, 10-500 mW/cm$^2$, or 50-100 mW/cm$^2$, such as 1 mW/cm$^2$, 5 mW/cm$^2$, 10 mW/cm$^2$, 50 mW/cm$^2$, 100 mW/cm$^2$, 500 mW/cm$^2$, 1000 mW/cm$^2$ or any value between 1 mW/cm$^2$ and 1000 mW/cm$^2$, or a value in a range between any two of these values (inclusive); the wavelength may be, for example, 240-410 nm, 280-380 nm, or 300-350 nm, such as 200 nm, 250 nm, 300 nm, 350 nm, 400 nm, 450 nm or any value between 200 nm and 450 nm, or a value in a range between any two of these values (inclusive); the time may be, for example, 0.1-20 h, 1-15 h, or 5-10 h, such as 0.01 h, 0.05 h, 0.1 h, 0.5 h, 1 h, 6 h, 12 h, 18 h, 24 h or any value between 0.01 h and 24 h, or a value in a range between any two of these values (inclusive).

In an optional embodiment, the thermal initiation is performed for 1-72 h at a temperature of 40-110° C.

Optionally, in the thermal initiation conditions, the temperature may be, for example, 50-100° C., 60-90° C., or 70-80° C., such as 40° C., 50° C., 60° C., 70° C., 80° C., 90° C., 100° C., 110° C. or any value between 40° C. and 110° C., or a value in a range between any two of these values (inclusive); and the time may be 5-65 h, 10-60 h, or 20-50 h, such as 1 h, 6 h, 12 h, 24 h, 36 h, 48 h, 60 h, 72 h or any value between 1 h and 72 h.

In an optional embodiment, the drying is performed for 18-24 h at a vacuum degree of 0.1-1000 Pa and a temperature of 20-100° C.

Optionally, in the drying conditions, the vacuum degree may be 1-800 Pa, 10-600 Pa, or 50-500 Pa, such as 0.1 Pa, 1 Pa, 10 Pa, 100 Pa, 500 Pa, 1000 Pa or any value between 0.1 Pa and 1000 Pa, or a value in a range between any two of these values (inclusive); the temperature may be, for example, 30-90° C., 40-80° C., or 50-70° C., such as 20° C., 30° C., 40° C., 50° C., 60° C., 70° C., 80° C., 90° C., 100° C. or any value between 20-100° C., or a value in a range between any two of these values (inclusive); and the time may be, for example, 19-23 h, 20-22 h, or 21-22 h, such as 18 h, 20 h, 22 h, 24 h or any value between 18 h and 24 h, or a value in a range between any two of these values (inclusive).

Some embodiments of the present disclosure further provide use of the humidity-stiffening polymer material in actuators, soft robots and wearable biomedical devices based on bionic design.

Some embodiments of the present disclosure further provide use of the humidity-stiffening polymer material prepared by the method in actuators, soft robots and wearable biomedical devices based on bionic design.

Some embodiments of the present disclosure provide further provide a method for manufacturing a component or an article, the method comprising stretching and/or thermoforming the humidity-stiffening polymer material according to any one of the above or the humidity-stiffening polymer material prepared by the method to define the component or article.

Some embodiments of the present disclosure further provide a thermoformed or stretched component or article, wherein the component or article comprises the humidity-stiffening polymer material according to any one of the above or the humidity-stiffening polymer material prepared by the method, or is manufactured by the manufacturing method described above.

In the humidity-stiffening polymer material provided by the present disclosure, benzyl methacrylate is used as the polymer monomer, and combined with the imidazole-based ionic liquid and a hygroscopic salt, and the polymer material obtained under the action of the cross-linking agent and the initiator has the following characteristics: under low humidity, the polymer material is homogeneous, the interaction between polymer chain segments is in an "off" state, and the polymer chain segments are soft and elastic; when the humidity rises to a specific value, strong phase separation occurs inside, and the interaction between the polymer chain segments in an "on" state, resulting in a strong interaction, which increases the modulus of the material.

The preparation method for the humidity-stiffening polymer material provided by the present disclosure has simple processes.

The humidity-stiffening polymer material provided by the present disclosure has wide applications.

Embodiments of the present disclosure will be described in detail below with reference to examples, but those skilled in the art will appreciate that the following examples are only illustrative of the present disclosure and should not be construed as limiting the scope of the present disclosure. If reaction conditions are not specified in the examples, conventional conditions or conditions recommended by the manufacturers shall be adopted. Reagents or instruments without specified manufacturers used herein are conventional products that are commercially available.

EXAMPLES

Example 1

0.5 g benzyl methacrylate (monomer, BzMA), 0.5 g 1-ethyl-3-methylimidazolium bis(trifluoromethylsulfonyl)imide (ionic liquid, [EMI][TFSI]), 0.25 g lithium bis(trifluoromethanesulphonyl)imide (hygroscopic salt, LiTFSI), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking oven, and subjected to cross-linking for 60 min at a power density of 50 mW/cm². After the reaction was completed, the glass mold was disassembled, the sample was taken out and placed in a vacuum drying oven, and subjected to vacuum degassing for 3 h at 70° C. to remove residual volatile monomers, so as to obtain polymer gel with humidity response characteristics, and the polymer gel was stored in a dryer at room temperature for later use.

Example 2

0.5 g benzyl methacrylate (monomer, BzMA), 0.5 g 1,3-dimethylimidazolium bis(trifluoromethylsulfonyl)imide (ionic liquid, [MMI][TFSI]), 0.25 g lithium bis(trifluoromethanesulphonyl)imide (hygroscopic salt, LiTFSI), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking box, and subjected to cross-linking for 60 min at a power density of 50 mW/cm². After the reaction was completed, the glass mold was disassembled, the sample was taken out and placed in a vacuum oven, and subjected to vacuum degassing for 3 h at 70° C. to remove residual volatile monomers, so as to obtain polymer gel with humidity response characteristics, and the polymer gel was stored in a dryer at room temperature for later use.

Example 3

0.5 g benzyl methacrylate (monomer, BzMA), 0.5 g 1-ethyl-3-methylimidazolium bis(trifluoromethylsulfonyl)imide (ionic liquid, [EMI][TFSI]), 0.05 g lithium trifluoromethanesulfonate (hygroscopic salt, LiOTf), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking box, and subjected to cross-linking for 60 min at a power density of 50 mW/cm². After the reaction was completed, the glass mold was disassembled, the sample was taken out and placed in a vacuum drying oven, and subjected to vacuum degassing for 3 h at 70° C. to remove residual volatile monomers, so as to obtain polymer gel with humidity response characteristics, and the polymer gel was stored in a dryer at room temperature for later use.

Example 4

0.5 g benzyl methacrylate (monomer, BzMA), 0.5 g 1-ethyl-3-methylimidazolium bis(trifluoromethylsulfonyl)imide (ionic liquid, [EMI][TFSI]), 0.25 g lithium bis(trifluoromethanesulphonyl)imide (hygroscopic salt, LiTFSI), 1 mg ethylene glycol dimethylacrylate (cross-linking agent, EDGMA), and 5 mg 1-azobisisobutyronitrile (thermal initiator) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was reacted at a constant temperature chamber of 70° C. for 12 h. After the reaction was completed, the glass mold was disassembled, the sample was taken out and placed in a vacuum drying oven, and subjected to vacuum degassing for 3 h at 70° C. to remove residual volatile monomers, so as to obtain polymer gel with humidity response characteristics, and the polymer gel was stored in a dryer at room temperature for later use.

Comparative Example 1

0.5 g benzyl methacrylate (monomer, BzMA), 0.5 g 1-ethyl-3-methylimidazolium bis(trifluoromethylsulfonyl)imide (ionic liquid, [EMI][TFSI]), 0.05 g sodium thiocyanate (hygroscopic salt, NaSCN), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking box, and subjected to cross-linking for 60 min at a power density of 50 mW/cm$^2$. After the reaction was completed, the glass mold was disassembled, the sample was taken out and placed in a vacuum drying oven, and subjected to vacuum degassing for 3 h at 70° C. to remove residual volatile monomers, so as to obtain ion gel with humidity response characteristics, and the ion gel was stored in a dryer at room temperature for later use.

Figure 5:
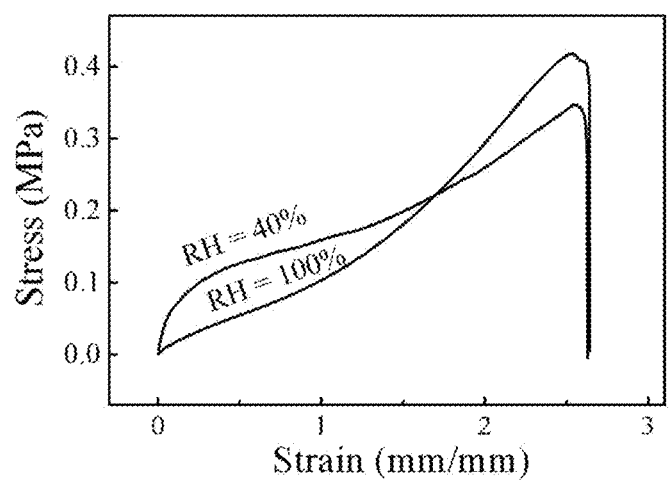
FIG. 5 shows a stress-strain curve of the material obtained in Comparative Example 1 in dry state and wet state.

After being humidified, the polymer gel obtained by the preparation method shows the phenomenon of being softening by humidity, and has no characteristic of being humidity-stiffening. After being tested by a universal testing machine, the mechanical changes are shown in FIG. 5.

Comparative Example 2

0.5 g methyl acrylate (monomer, MA), 0.5 g 1-ethyl-3-methylimidazolium bis(trifluoromethylsulfonyl)imide (ionic liquid, [EMI][TFS]), 0.25 g lithium bis(trifluoromethanesulphonyl)imide (hygroscopic salt, LiTFSI), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking box, and subjected to cross-linking for 60 min at a power density of 50 mW/cm$^2$. After the reaction was completed, the glass mold was disassembled, the sample was taken out and placed in a vacuum drying oven, and subjected to vacuum degassing for 3 h at 70° C. to remove residual volatile monomers, so as to obtain polymer gel.

After being humidified, the polymer gel obtained by the preparation method shows the phenomenon of being softening by humidity, and has no characteristic of being humidity-stiffening. After being tested by a universal testing machine, the mechanical changes are similar to that of Comparative Example 1.

Comparative Example 3

0.5 g benzyl methacrylate (monomer, BzMA), 0.5 g 1-ethyl-3-methylimidazolium dicyanamide (ionic liquid, [EMI][DCA]), 0.25 g lithium bis(trifluoromethanesulphonyl)imide (hygroscopic salt, LiTFSI), 1 mg ethylene glycol dimethylacrylate (cross-linking agent, EDGMA), and 5 mg 1-hydroxy-cyclohexyl phenyl ketone (photoinitiator 184) were mixed and fully stirred to homogeneity to form a precursor liquid. The precursor liquid uniformly mixed was put into a vacuum oven, and subjected to degassing for 30 s at a vacuum degree of 0.1 bar. The degassed precursor solution was injected into the assembled glass sheet-silica gel pad-glass sheet sandwich cavity (the glass sheet was coated with a release film). The mold with the precursor liquid injected was placed into an ultraviolet crosslinking box, and subjected to cross-linking for 60 min at a power density of 50 mW/cm$^2$. After the reaction was completed, the glass mold was disassembled, the sample was taken out and placed in a vacuum drying oven, and subjected to vacuum degassing for 3 h at 70° C. to remove residual volatile monomers, so as to obtain polymer gel.

After being humidified, the polymer gel obtained by the preparation method also exhibits a phenomenon of being softened by humidity, and has no characteristic of being humidity-stiffening. After being tested by a universal testing machine, the mechanical changes are similar to that of Comparative Example 1.

The humidity-responsive materials obtained in the above Examples 1~4 and Comparative Examples 1-3 were characterized, which mainly included mechanical enhancement properties under different humidity, and the influence of different feed ratios on modulus comparison was investigated.

In the context herein, the moisture treatment of the materials is obtained by a chamber with constant temperature and humidity (model: BPS-50CL; manufacturer: Shanghai Yiheng Instrument Co., Ltd.), the moisture of which is determined by a moisture sensor provided in the chamber with constant temperature and humidity.

(I) Demonstration of Mechanical Properties

Material pretreatment: the material obtained in Example 1 was subjected to different degrees of humidification treatment to obtain a material with RH (relative humidity)=40% (as shown in FIGS. 1(a) and 1(b)) and a material with RH (relative humidity)=100% (as shown in FIGS. 1(c) and 1(d)), and it can be seen from FIG. 1(c) that the appearance of the sample after being sufficiently humidified exhibits a phenomenon of being significant hardening by humidity;

test method: the two groups of materials were pulled by 921 g weight, as shown in FIG. 1(b), the material with RH=40% cannot lift the weight, and as shown in FIG. 1(d), the material with RH=100% can lift the weight.

FIG. 1 is a demonstration photograph of the mechanical properties of the material obtained in Example 1 under different humidity, visually illustrating the characteristic of being humidity-stiffening.

(II) Stress-Strain Characteristics in Dry State and Wet State

Material pretreatment: the materials of Examples 1-3 and Comparative Example 1 were subjected to different degrees of humidification treatment to obtain materials with RH=40% and RH=100%;

test method: the above materials were tested by a universal testing machine (model: UTM 6104; manufacturer: Shenzhen Suns Technology Stock Co., Ltd.), wherein parameter was set as follows: the stretching rate is 100 mm/min, and the temperature was 25° C.; and the stress-strain curves of different materials in dry and wet states were obtained.

Figure 2:
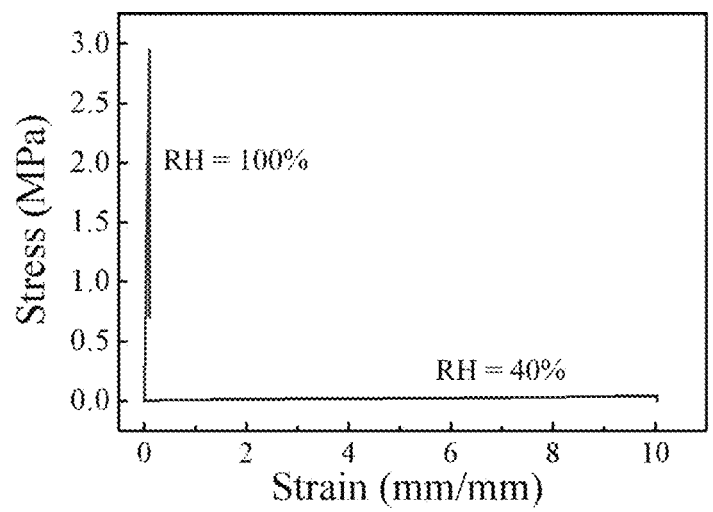
FIG. 2 shows a stress-strain curve of the material obtained in Example 1 in dry state and wet state.
Figure 3:
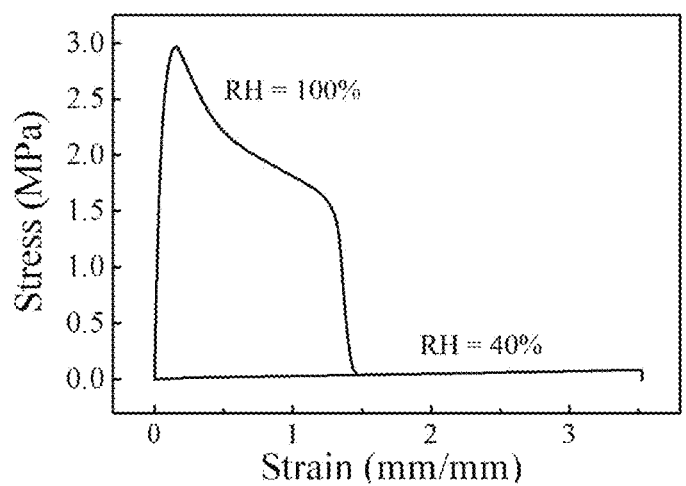
FIG. 3 shows a stress-strain curve of the material obtained in Example 2 in dry state and wet state.
Figure 4:
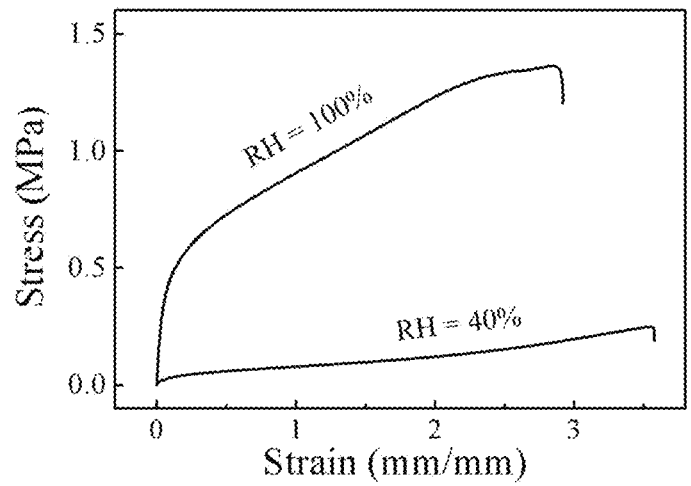
FIG. 4 shows a stress-strain curve of the material obtained in Example 3 in dry state and wet state.

FIGS. 2, 3 and 4 correspond to the stress-strain curves of Examples 1, 2 and 3, respectively, in dry and wet states, and the results show that the elastic modulus in the wet state is significantly higher than that in the dry state. FIG. 5 shows the stress-strain curve of Comparative Example 1 in dry and wet states; and the result shows that the elastic modulus of the material in the dry state is significantly higher than that in the wet state, and the material belongs to a conventional material system. Comparative Examples 2 and 3 have similar effects to Comparative Example 1, which belong to a conventional material system.

(III) Changes of Storage Modulus and Loss Modulus of Material in Dry and Wet States Under Different Frequencies Material pretreatment: the materials in Example 1 in dry and wet states were obtained in the same way as in (I) above.

Test method: the humidity-treated material was tested by a dynamic mechanical analyzer (model: Q850; manufacturer: TA Instruments), wherein the parameters were set as follows: the temperature was 25° C., testing frequency was 0.01-10 Hz, and testing strain was 0.1%; the test results are shown in FIG. 6.

Figure 6:
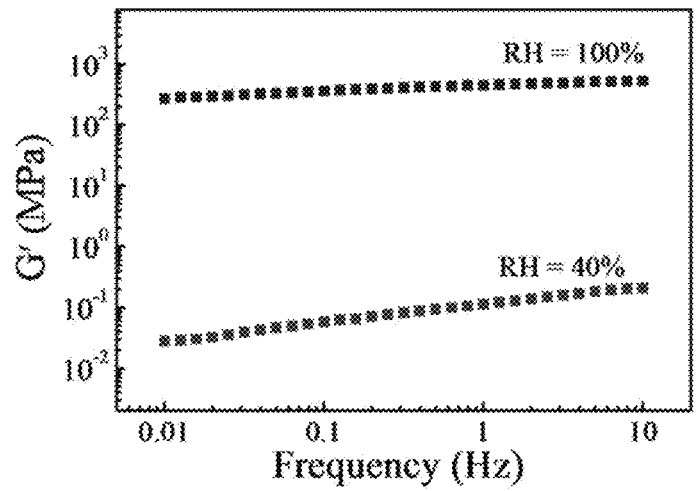
FIG. 6 shows the change curves of the storage modulus and loss modulus of the material obtained in Example 1 at different frequencies in dry state and wet state.

FIG. 6 shows the changes of the storage modulus and loss modulus of the material in Example 1 at different frequencies in dry and wet states, showing approximately 3 orders of magnitude change in modulus.

Figure 7:
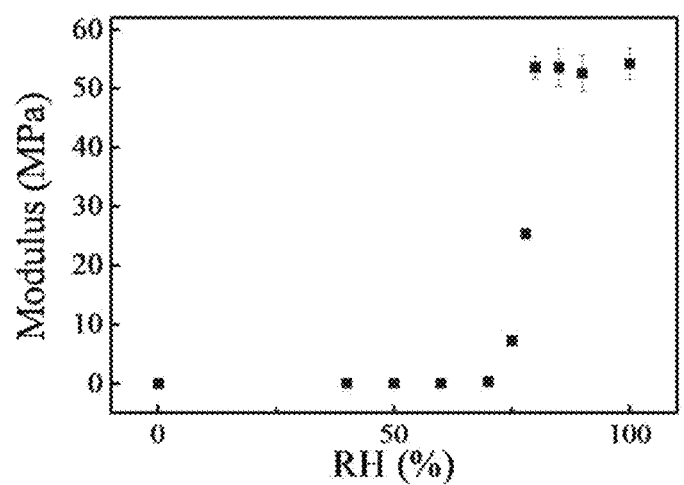
FIG. 7 is a graph showing the changes of the elastic modulus of the material obtained in Example 1 under different humidity.

(IV) Changes of Elastic Modulus of Material in Dry and Wet States Under Different Humidity Material pretreatment: the material of Example 1 was subjected to different degrees of humidification, obtaining materials with the following humidity: RH=0% (untreated), RH=40%, RH=50%, RH=60%, RH=70%, RH=75%, RH=78%, RH=80%, RH=85%, RH=90%, and RH=100%;

test method was as follows: materials with different humidity were tested by a universal tester (model: UTM 6104; manufacturer: Shenzhen Suns Technology Stock Co., Ltd.), wherein parameter was set as follows: the stretching rate is 100 mm/min, and the temperature was 25° C.; the test results are shown in FIG. 7. FIG. 7 shows the changes of elastic modulus of the material in Example 1 under different humidity.

(V) Dynamic Changes of Storage Modulus and Loss Modulus of Material Over Humidity Test method: the different humidity states of the materials prepared in Example 1 were obtained with an additionally equipped humidity accessory of a dynamic mechanical analyzer (model: DMA-RH; manufacturer: TA Instruments), the humidity of which was determined with a humidity sensor provided in the humidity accessory. The material was tested by a dynamic mechanical analyzer (model: Q850; manufacturer: TA Instruments), wherein the parameters were set as follows: the temperature was 25° C., humidity range was 10%-90% RH, change rate of humidity was 2% RH min-1, testing frequency was 1 Hz, and testing strain was 0.1%; and the test results are shown in FIG. 8.

Figure 8:
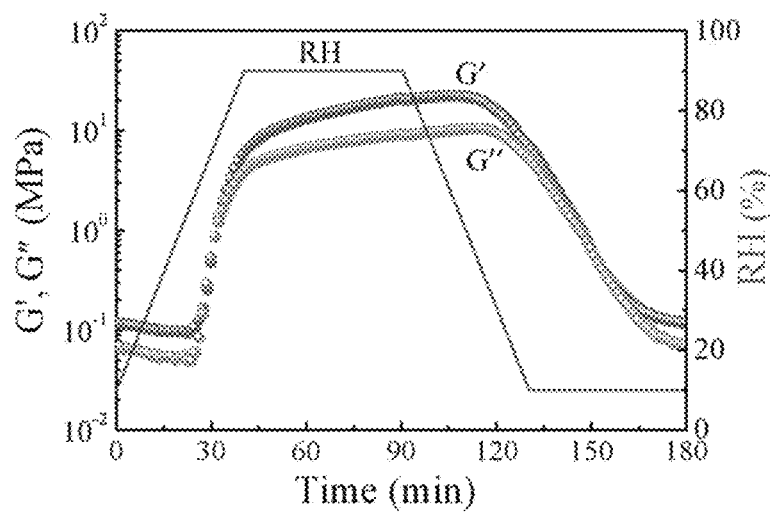
FIG. 8 shows the dynamic change curves of the storage modulus and loss modulus of the material obtained in Example 1 over humidity.

FIG. 8 shows the dynamic changes of storage modulus and loss modulus over humidity (10%→90%→10%) in Example 1, and the results further demonstrate the humidity-stiffening properties and reversibility.

Figure 9:
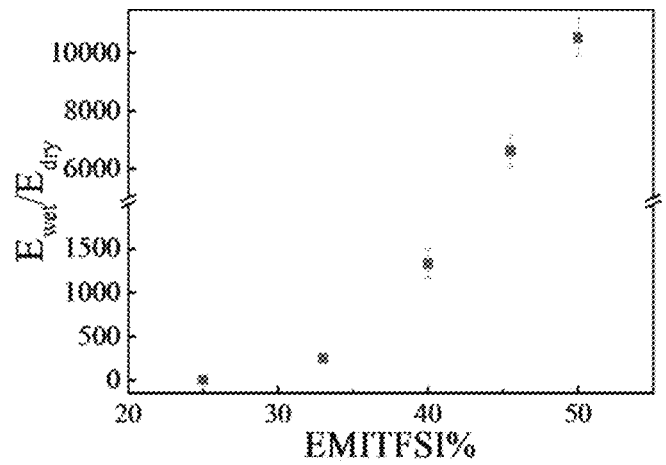
FIG. 9 is a graph showing the effect of adjusting different ionic liquid contents on the modulus ratio according to the scheme provided in Example 1.

(VI) Effect of Different Ionic Liquid Contents in the Material on the Modulus Ratio Material preparation: based on the preparation system of Example 1, the only difference was that the content of 1-ethyl-3-methylimidazolium bis(trifluoromethylsulfonyl) imide was 25% (0.5 g), 33% (0.75 g), 40% (1.0 g), 45% (1.25 g), and 50% (1.5 g), respectively;

test method: the prepared material was subjected to the same treatment method as in (I) above with a universal testing machine (model: UTM 6104; manufacturer: Shenzhen Suns Technology Stock Co., Ltd.), wherein parameter was set as follows: the stretching rate is 100 mm/min, and the temperature was 25° C.; and the testing results are shown in FIG. 9. FIG. 9 shows the effect of different ionic liquid contents on modulus ratio in Example 1.

(VII) Effect of Lithium Salt Content on Modulus Ratio

Figure 10:
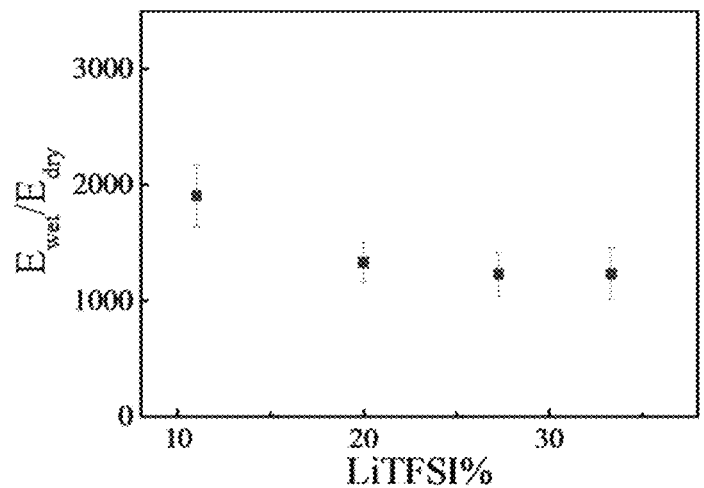
FIG. 10 is a graph showing the effect of changing lithium salt contents on the modulus ratio according to the scheme provided in Example 1.

Material preparation: based on the preparation system of Example 1, the only difference was that the content of lithium bis(trifluoromethanesulphonyl)imide was 11% (0.25 g), 20% (0.5 g), 27% (0.75 g), and 33% (1 g), respectively;

test method: the prepared material was subjected to the same treatment method as in (I) above with a universal testing machine (model: UTM 6104; manufacturer: Shenzhen Suns Technology Stock Co., Ltd.), wherein parameter was set as follows: the stretching rate is 100 mm/min, and the temperature was 25° C.; and the testing results are shown in FIG. 10. FIG. 10 shows the effect of changing lithium salt contents on the modulus ratio according to the scheme provided in Example 1.

The present disclosure provides a novel "humidity-stiffening" environmental stimulus-responsive material, and the design provides a new concept for the field of bionic materials. Meanwhile, the humidity-responsive material provided by the present disclosure is prepared by adopting a photoinitiation (or thermal initiation) method that is convenient, quick and easy to operate. The particularity of the system consisting of the selected polymer benzyl methacrylate and imidazolium-based ionic liquid determines the phase change susceptibility of the ionic gel, wherein the presence of salts maintains the homogeneity of the system, while highly hygroscopic salts tend to bind to water molecules in the air, thereby causing phase separation. The mechanical property of the material in a dry state may be controlled by adjusting the feed ratio of the monomer and the ionic liquid and the amount of the cross-linking agent used, and the water absorption may be controlled by adjusting the feed ratio of the monomer and the salt. The humidity-stiffening polymer material provided by the present disclosure has an increase up to 4 orders of magnitude in Young's modulus and no significant change in volume after the humidity is increased to a specific range, and the softening-hardening transition process is highly reversible.

Finally, it should be noted that: the above examples are only used to illustrate the technical schemes of the present disclosure, and should not limit the same; although the present disclosure is described in detail with reference to the examples described above, it will be understood by those of ordinary skill in the art that, the technical schemes in the examples described above can still be modified, or some or all of the technical features can be equivalently replaced; and these modifications or replacements do not make the essence of the corresponding technical schemes depart from the scope of the technical schemes in the examples of the present disclosure.

Moreover, those skilled in the art should understand that while some examples herein include some features included in other examples but not others, combinations of features of different examples are meant to be within the scope of the present disclosure and form different examples. For example, in the claims above, any one of the claimed examples may be used in any combination. The information disclosed in this background section is only intended to enhance understanding of the general background of the present disclosure and should not be considered as an acknowledgment or any form of suggestion that this information constitutes the prior art that is already known to those skilled in the art.

INDUSTRIAL APPLICABILITY

The humidity-stiffening polymer material provided by the present disclosure has an increase up to 4 orders of magnitude in Young's modulus and no significant change in volume after the humidity is increased to a specific range, and the softening-hardening transition process is highly reversible, so that this material has excellent performance, can be widely applied to the fields of actuators, soft robots, wearable biomedical devices and the like based on bionic design, and has a broad market prospect.

The invention claimed is:

1. A humidity-stiffening polymer material, comprising following raw materials:
   a monomer, an ionic liquid, a salt, a cross-linking agent and an initiator, wherein
   the monomer is benzyl methacrylate, the ionic liquid is one or more of 1,3-dimethylimidazolium bis(trifluoromethylsulfonyl)imide, 1-ethyl-3-methylimidazolium bis(trifluoromethylsulfonyl)imide, 1-propyl-3-methylimidazolium bis(trifluoromethylsulfonyl)imide, and 1-butyl-3-methylimidazolium bis(trifluoromethylsulfonyl)imide, and the hygroscopic salt is one or more of lithium bis(trifluoromethanesulphonyl)imide, lithium trifluoromethanesulfonate, zinc bis(trifluoromethylsulfonyl)imide, zinc trifluoromethanesulfonate, and potassium bis(trifluoromethanesulfonly)imide.

2. The humidity-stiffening polymer material according to claim 1, wherein the cross-linking agent comprises one or more of a multifunctional acrylate cross-linking agent, a multifunctional acrylamide cross-linking agent, and a multifunctional vinyl cross-linking agent.

3. The humidity-stiffening polymer material according to claim 2, wherein the multifunctional acrylate cross-linking agent comprises: one or more of poly(ethylene glycol) diacrylate, 1,3-propanediol diacrylate, 1,4-butanediol diacrylate, 1,6-hexanediol diacrylate, ethylene glycol dimethylacrylate, and ethylene glycol diacrylate;
   the multifunctional acrylamide cross-linking agent comprises methylenebisacrylamide; and
   the multifunctional vinyl cross-linking agent comprises divinylbenzene and/or diethylene glycol divinyl ether.

4. The humidity-stiffening polymer material according to claim 1, wherein the initiator comprises a photoinitiator or a thermal initiator;
   the photoinitiator comprises one or more of 2,4,6 (trimethylbenzoyl)diphenylphosphine oxide, ethyl 2,4,6-trimethylbenzoylphosphinate, 2-methyl-1-[4-methylthiophenyl]-2-morpholino-1-propanone, 2-isopropylthioxanthone, ethyl 4-(dimethylamino)benzoate, 1-hydroxy-cyclohexyl phenyl ketone, 2-hydroxy-2-methyl-1-phenyl-1-propanone, benzoin dimethyl ether, methyl o-benzoylbenzoate, 4-chlorobenzophenone, 4-phenylbenzophenone and 2-hydroxy-2-methyl-1-[4-(2-hydroxyethoxy)phenyl]-1-propanone; and
   the thermal initiator comprises one or more of azobisisobutyronitrile, azobisisovaleronitrile, azobisisoheptonitrile, dimethyl 2,2'-azobis(2-methylpropionate), 2-(1-cyano-1-methylethyl)azocarboxamide, 1,1'-azobis(cyanocyclohexane), dibenzoyl peroxide, dicumyl peroxide, methyl ethyl ketone peroxide, di-tert-butyl peroxide, potassium persulfate, and ammonium persulphate.

5. The humidity-stiffening polymer material according to claim 1, wherein a mass ratio of the monomer to the ionic liquid is 1:0.5-1.5, a mass ratio of the monomer to the salt is 1:0.25-1, a mass of the cross-linking agent accounts for 0.01%-10% of a mass of the monomer, and an amount of the initiator accounts for 0.01%-10% of the mass of the monomer.

6. The humidity-stiffening polymer material according to claim 5, wherein the mass ratio of the monomer to the ionic liquid is 1:1, the mass ratio of the monomer to the salt is 1:0.5, the mass of the cross-linking agent accounts for 0.1%-1% of the mass of the monomer, and the amount of the initiator accounts for 0.5%-5% of the mass of the monomer.

7. A method for preparing the humidity-stiffening polymer material according to claim 1, comprising:
   mixing the raw materials to obtain a precursor liquid, performing reaction on a mixture after degassing, and drying the mixture to obtain the humidity-stiffening polymer material.

8. The method according to claim 7, wherein the degassing is performed for 0.5-30 min at a vacuum degree of 1-20 KPa;
   a reaction condition is photoinitiation or thermal initiation;
   the photoinitiation is performed for 0.01-24 h with a light source power density of 1-1000 mW/cm$^2$ at a wavelength of 200-450 nm;
   the thermal initiation is performed for 1-72 h at a temperature of 40-110° C.; and
   the drying was performed for 18-24 h at a vacuum degree of 0.1-1000 Pa and a temperature of 20-100° C.

* * * * *